Aug. 4, 1964 K. BERMAN 3,143,446
PROPELLANT CHARGE CONTAINING FLUID ENCAPSULATIONS
Filed Nov. 27, 1959

INVENTOR.
KURT BERMAN
BY John F. Cullen
ATTORNEY

United States Patent Office 3,143,446
Patented Aug. 4, 1964

3,143,446
PROPELLANT CHARGE CONTAINING FLUID ENCAPSULATIONS
Kurt Berman, Schenectady, N.Y., assignor to General Electric Company, a corporation of New York
Filed Nov. 27, 1959, Ser. No. 855,806
8 Claims. (Cl. 149—2)

The present invention relates to a reaction engine propellant and, more particularly, to a solid propellant for a rocket engine.

There are basically two types of rocket motors in existence today, the liquid propellant type and the solid propellant type. Both types have their advantages and disadvantages. One of the advantages of liquid propellant motors is that the liquid may be easily controlled and turned off to shut the motor down and the motor may be restarted by turning the liquid on again. In addition, the liquid type motors in general have much higher energy, giving more energy per pound since a given quantity of liquid, usually has more energy than solid propellants. A disadvantage of the all liquid propellant type motor is the complexity of liquid storage, pumping and profusion of parts involved in the control mechanism. Also serious servicing problems are presented by liquid and instantaneous readiness is almost impossible.

On the other hand, solid propellants are useful because of their ease of storage in which the propellants can be cast in a block form, mounted in the engine and set aside until time for use. Solid propellant rockets have higher reliability because of the smaller number of moving parts, thus offering fewer field servicing problems as well as instant readiness. Such solids also have disadvantages in that the specific impulses are not equivalent to those obtainable by the use of liquids and, once ignited, the propellant burns until exhausted since there are few reliable means to extinguish the rocket and then reignite it. In addition, long burning times over several minutes duration are difficult because uncooled nozzles are difficult to keep intact. It is felt that a solid propellant rocket propulsion system could become even more attractive and versatile if it were imbued with some of the performance advantages of the liquid propellants without losing the simplicity advantages of the solid propellant. Thus a reaction engine such as a rocket motor having a combustible mixture in the form of a solid but which still has the high energy content of liquids would be a desirable combination. Such solid propellants must retain the characteristics of the usual solids in being able to be cast in block form, being inherently stable under ambient conditions, and being cheap to manufacture. Such propellant normally require fuels and oxidizers, unless they are mono-propellants, to combine and produce heat and consequently thrust.

The main object of the present invention is to provide a reaction motor propellant that partakes of the advantages of both solids and liquids.

A further object is to provide such a propellant wherein the propellant is in the solid form within the engine and has liquid propellant available within itself.

Another object is to provide such a solid propellant charge composed of both solids and liquids of fluids or oxidizers or both.

A further object is to provide such a solid propellant charge in the form of a matrix which may be a propellant that carries within itself fluids that may be fuels or oxidizers or both.

A further object is to provide a combustible mixture which is in the form of a solid or rigid matrix having embedded therein fluids of one or more kind that are normally non-reactive at ambient conditions with the matrix and with each other.

Briefly stated, the invention discloses a solid propellant type reaction motor, such as a rocket engine, which has a propellant charge in a rigid or solid cast type form and in which the charge includes encapsulated balls of liquid propellant in random distribution throughout a rigid matrix forming the solid charge. In addition, the invention includes, as a part thereof, the propellant charge as a combustible material having separate balls of fluid of different material disposed in random distribution throughout a rigid matrix wherein each ball is separately encapsulated in a casing which is not reactive with the fluid and with the matrix at ambient conditions.

While the specification concludes with claims particularly pointing out and distinctly claiming the subject matter which is regarded as the invention, it is believed the invention will be better understood from the following description taken in connection with the accompanying drawing in which:

Figure 2:
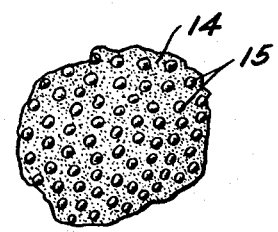
FIGURE 2 is a cross-section of a typical combustible mixture having balls of encapsulated fluid in a matrix.
Figure 4:
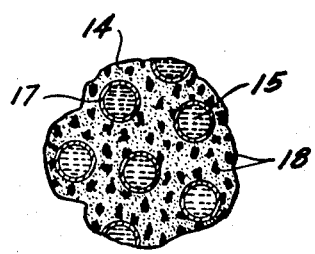
Figure 5:
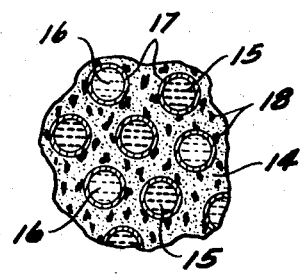

FIGURE is a view, similar to FIGURE 2, showing balls of a plurality of fluids;

FIGURE 4 is a partial cross-sectional view of a combustible mixture having liquid and solid propellants therein; and FIGURE 5 is a view, similar to FIGURE 4, showing the matrix having a plurality of fluids and a solid propellant distributed therein.

While the particular invention is herein described especially in reference to a reaction motor such as a rocket engine, this is for illustration only and it should be appreciated that the combustible mixture of the novel type set forth herein may have other utility than in the combination with a reaction engine.

Figure 1:
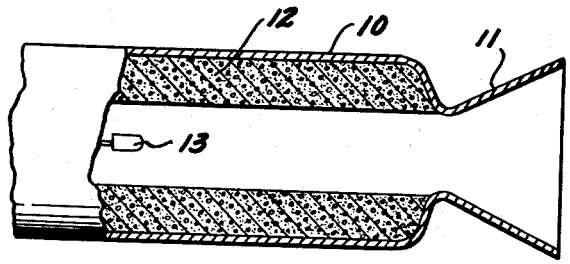
FIGURE 1 is a partial cross-section of a rocket motor with a charge therein.

Referring first to FIGURE 1 there is shown a cross-section of a reaction motor such as a rocket engine which comprises a casing 10 joined in any suitable manner to an exhaust nozzle 11 for producing thrust in the normal manner. In order to provide a combustion product for thrust, a propellant charge 12 is disposed within the casing 10 and adapted for burning in the usual manner. Charge 12 may be ignited by any suitable means such as igniter 13 diagrammatically shown in FIGURE 1.

In order to obtain the advantages of solid propellants, such as the ability to cast charge 12 within the casing 10 for stability and ease of storage and other general desirable characteristics of solids, the present invention proposes a solid charge of this castable type which has disposed throughout its interior, balls of liquid propellant in order to obtain the high inherent performance advantages of liquid but none of the disadvantages therewith, and, at the same time, the castable and easy storage characteristics of solid propellants.

As shown in FIGURE 2, charge 12 may consist of a rigid or solid type matrix 14. The use of the term rigid herein is intended to means solid-like or shape-retaining at ambient conditions. The materials meeting this definition are intended to be included by the term rigid material. To provide the advantages obtainable with liquid propellants, there is disposed throughout the matrix 14 tiny balls of fluid 15 which are in random distribution throughout rigid matrix 14. The balls 15 may be any suitable shape and, as indicated, will generally be spherical or ball shaped but the terms ball is intended to cover separate fluid elements regardless of the shape. To permit the making of the solid charge with the random distribution of the balls 15, since both are in a fluid state during manufacture, it is necessary to separate the balls 15 from the matrix 14. This is done by encapsulating or surrounding each ball 15 with a suitable material so that the balls are like marbles with fluid or liquid interiors. Thus constituted, they may be randomly mixed in a matrix 14 which can be cast around a large quantity of the balls to form a combustible mixture.

In the case of a propellant charge such as in the engine shown in FIGURE 1, it is possible to provide a fluid oxidizer in the ball 15 such as chlorine-trifluoride, bromine penta fluoride, nitrogen tetra-oxide and perchloryl fluoride and the matrix 14 may supply the fuel and may be composed of plastics such as polyurethanes, polyvinyl alcohol, polybutadiene acrylic acid or metals such as aluminum or beryllium. In addition, the encapsulating material surrounding the ball 15 can supply part of the fuel and may be made of plastics such as polyurethanes, polyvinyl alcohol, polybutadiene, acrylic acid or metals such as aluminum or beryllium. The requirements for stability are that the fluids must be non-reactive at ambient conditions with the encapsulating material surrounding each ball which material, in turn, must be non-reactive with the matrix all at ambient conditions and, when in contact may be reactive with one another and/or the matrix. Thus, such a charge of combustible material may be maintained in a solid or rigid state and is comprised of a large part of liquid to obtain the advantages of liquid propellants.

Figure 3:
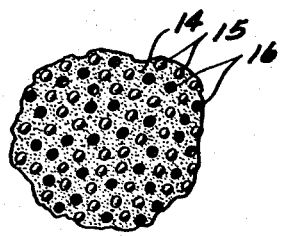

Various combinations may be made in that both liquid oxidizer and liquid fuel may appear in the same matrix as illustrated in FIGURE 3 wherein balls of liquid fuel 16 may also be disposed randomly in matrix 14. Such a fuel may be kerosene, hydrazine, ethyl alcohol, and unsymmetrical dimethyl hydrazine and again the encapsulating material for the fluid balls is non-recative with each fluid as well as the matrix at ambient conditions and during the manufacturing operation. It can be seen in this FIGURE 3 modification that highly reactive fuels and oxidizers may be placed within the matrix 14 in a very stable condition since they are not in contact with one another although physically disposed very close to one another. Thus the charge is stable and rigid under normal conditions.

A further combination possible is shown in FIGURE 4 wherein there is shown encapsulating material 17 surrounding the fluid 15 in matrix 14 and, in this modification, additional solid propellants 18 may be disposed throughout the matrix in a well-known manner. A typical example of the FIGURE 4 modification would use liquid oxidizer as a fluid 15 with the solid oxidizer 18 consisting of the perchlorates such as ammonium perchlorate and, nitrates such as ammonium nitrate and the fuel matrix 14 consisting of plastics such as polyurethanes, polyvinyl alcohol, polybutadiene acrylic acid or metals such as aluminum or beryllium.

Another modification is shown in FIGURE 5 wherein two fluids, which may be oxidizer 15 and fuel 16, are encapsulated by suitable material 17 and randomly distributed within matrix 14 which also has distributed therein a solid propellant 18.

All these modifications are intended to illustrate combustible materials or propellant charges which are normally stable and rigid but have a large amount of fluid distributed therethrough. Actually the matrix 14 may preferably form a very small part of the over all volume of the charge. Since the charge is normally stable under ambient conditions, it is generally necessary to provide heat in order for combustion to take place and this may be done in any suitable means such as an igniter 13 illustrated in FIGURE 1. The use of heat will melt or dissolve the encapsulating material, expose the fluids which may be highly reactive one with the other and with the matrix, in order to bring about the chemical reaction once the fluids and matrix are in contact with one another.

It can be seen that, by this means, highly reactive fluids as well as matrix material may be maintained in a stable and rigid or solid condition until the application of heat and therefore a solid charge for the engine shown in FIGURE 1 has all the performance advantages of liquid propellants as well as the advantages of the solid propellants.

While there has been hereinbefore described a preferred form of the invention, obviously many modifications and variations of the present invention are possible in the light of the above teachings. It is therefore to be understood that within the scope of the appended claims, the invention may be practiced otherwise than as specifically described.

I claim:
1. A charge for a reaction engine comprising:
 (a) a matrix cast into a rigid state of desired shape,
 (b) a plurality of capsule envelopes randomly distributed throughout said matrix, each of said envelopes being non-reactive with said matrix at ambient conditions and,
 (c) at least one fluid encapsulated in said envelopes, said fluid being non-reactive with said envelopes at ambient conditions; said charge forming a solid propellant wherein, under elevated temperature conditions, the capsule envelopes dissolve permitting mixture of the fluid in said envelopes and of the fluid and the rigid matrix, at least one of said mixtures resulting in a chemical reaction which produces a propelling force by the expulsion of the reaction products.
2. A charge as defined in claim 1 in which said fluid is a liquid.
3. A charge as defined in claim 1 in which said matrix contains a solid oxidant.
4. A charge as defined in claim 1 in which said matrix contains a solid fuel.
5. A charge as defined in claim 1 in which a plurality of fluid materials are encapsulated, said fluids being reactive with one another when in contact therewith.
6. A charge as defined in claim 5 in which at least one of said fluids is a liquid.
7. A charge as defined in claim 5 in which at least one of said fluids is an oxidant.
8. A charge as defined in claim 5 in which at least one of said fluids is a fuel.

References Cited in the file of this patent

UNITED STATES PATENTS

| | | |
|---|---|---|
| 2,072,671 | Foulke | Mar. 2, 1937 |
| 2,129,875 | Rost | Sept. 13, 1938 |
| 2,600,678 | O'Neill | June 17, 1952 |
| 2,628,561 | Sage et al. | Feb. 17, 1953 |
| 2,703,960 | Prentiss | Mar. 15, 1955 |
| 2,802,332 | Orisno | Aug. 13, 1957 |
| 2,813,487 | Miller et al. | Nov. 19, 1957 |
| 2,960,935 | Colpitts | Nov. 22, 1960 |
| 2,970,898 | Fox | Feb. 7, 1961 |